E. E. CLAUSSEN.
APPARATUS FOR CONCENTRATING MILK.
APPLICATION FILED JULY 20, 1907.

915,019.

Patented Mar. 9, 1909.
2 SHEETS—SHEET 1.

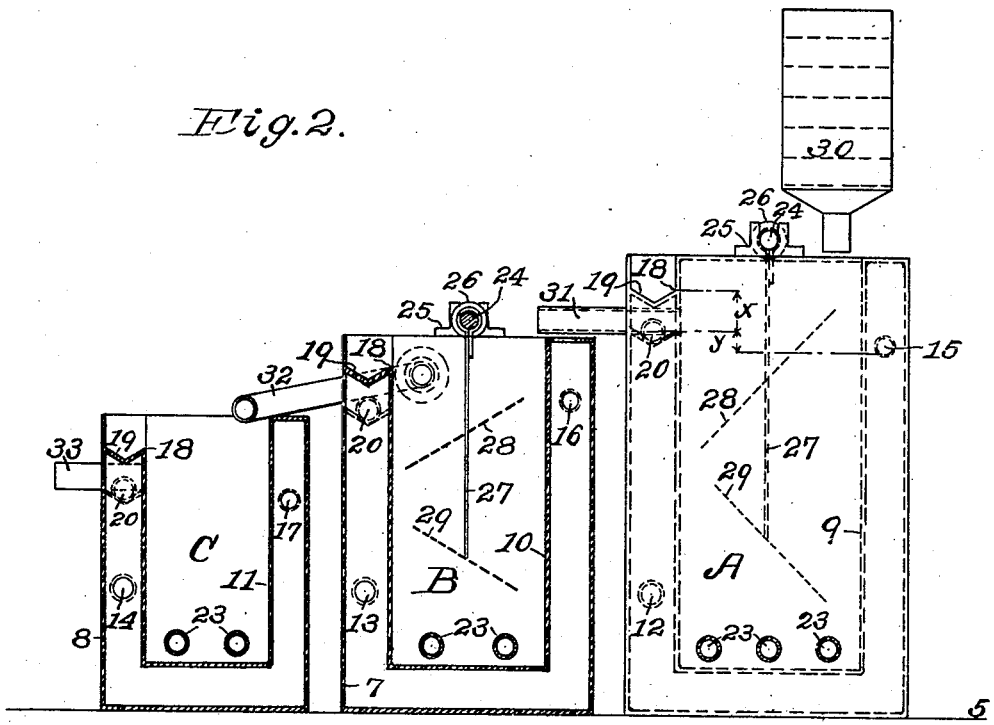
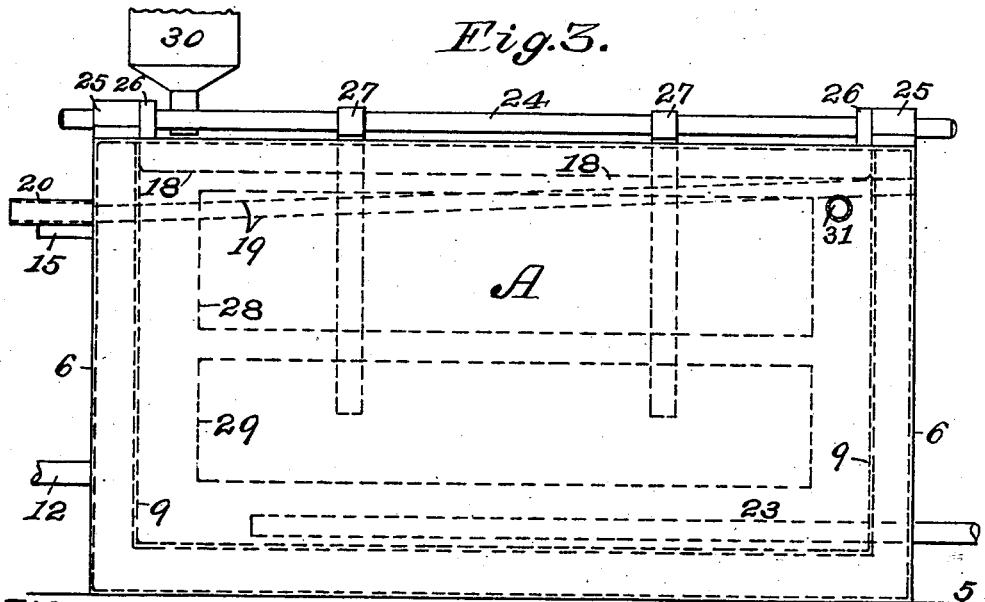

UNITED STATES PATENT OFFICE.

EDWARD EMIL CLAUSSEN, OF HARTFORD, CONNECTICUT.

APPARATUS FOR CONCENTRATING MILK.

No. 915,019.          Specification of Letters Patent.          Patented March 9, 1909.

Application filed July 20, 1907. Serial No. 384,792.

*To all whom it may concern:*

Be it known that I, EDWARD EMIL CLAUSSEN, a citizen of the United States of America, and a resident of Hartford, in the county of Hartford and State of Connecticut, with a post-office address in the above place, have invented certain new and useful Improvements in Apparatus for Concentrating Milk, of which the following is a specification.

This invention relates to apparatus for the treatment of milk, such as common cow's milk, for the purpose of concentrating it to about the consistency of what is termed in commerce as condensed milk, or reducing it to about one-third of its original bulk.

The object of this invention is to provide an apparatus which is continuous in its operation in which milk flows into the apparatus at one end and the concentrated milk is drawn off at the other.

Another object of this invention is to provide an overflow which receives the foaming overflowing milk when it is too violently agitated by the air injected.

Another object of this invention is to provide a screen which breaks up the large air bubbles and divides the same into a number of smaller ones and also at the same time separates the milk and maintains a most effective agitation of the same.

A further feature of this invention, resides in the arrangement, whereby the succeeding receptacles are of varying capacity, so that no baking or burning of the product can occur to the walls of the vessels and thereby prevents spoiling of the product.

Further objects of the invention will hereinafter appear such as the relative positions of the overflow edge, the milk discharge and the hot water discharge, and to these ends the invention consists of a means for carrying out the above objects illustrated in the accompanying drawings in which:—

Figure 1 represents a plan view of my improved apparatus for extracting water from ordinary cow's milk. Fig. 2 represents an end elevation of what is shown in Fig. 1, part of that figure being shown in section. Fig. 3 shows a front elevation taken on the dash and dotted line 3—3 of Fig. 1 and in the direction of the arrows.

In the views, 5 represents the floor upon which the apparatus is placed, and it comprises a series of two or three receptacles A, B and C, depending upon the amount of concentration required. In practice the milk is reduced to about one-third of its original bulk and I therefore prefer to use three receptacles. Each receptacle consists of an outer or larger tank 6, 7 and 8 into which depends an inner or smaller tank 9, 10, and 11 leaving a space between the two which is filled with hot water from inlet or supply pipes 12, 13 and 14 and ejected through the discharge pipes 15, 16 and 17 whereby the inner tank is heated and maintained at a certain temperature. In practice I prefer to maintain the temperature in the receptacles A, B and C at 150, 120 and 90 degrees Fahrenheit respectively.

The inner or smaller tank depends into the larger tank and has one side shorter or lower than the three others forming an over-flow edge as shown at 18, the purpose of which will be described hereinafter. Located close to the overflow and connecting the inner and outer tanks is the trough 19 set at an incline as shown in Fig. 3 and terminating in the discharge pipe 20. Each trough 19 constitutes a part of the web connecting the pairs of tanks above their bottoms. This web therefore provides for an inclosed hot water space at each tank, one part of the web being lower than the remainder and being channeled to present the trough to which allusion has been made.

21 are pipes connected to a supply of air of sufficient pressure to keep the milk in the smaller tank in a violent agitation, the supply of which is regulated by valves 22. Extending from the pipes 21 and into the tank are branches of air pipes 23 passing along and near the bottom of the tank and said branch pipes are provided with innumerable air jet discharge apertures 34, which are arranged so as to discharge the air into and through the mass of milk keeping the same in a violent state of continuous agitation.

24 is a rod supported in bearings 25, on the ends of the receptacles and held in position by the collars 26. Fastened to the rod are strips of metal 27 to which are fastened foraminous or reticulated screens 28 and 29 set at an angle, the whole set into the inner tank so that the same can be readily removed and cleaned. This arrangement is such, that the air bubbles coming from the branches of air pipe discharge apertures 34 rise and strike against the screens and break up the same into still smaller air bubbles and also serve to separate the milk particles from each other. The ends of the rods which support the screens project beyond the receptacles and act as handles whereby the screens can be taken out and cleaned.

30 is a filter located at any convenient place over the receptacle A, the largest one of the group, into which the milk is continuously pumped by any well known means, and whereby the milk is separated from the dust, impurities and dense matter which is more or less present when delivered to the factory.

31 is the discharge pipe of the milk from the receptacle A to the receptacle B, whereas 32 represents the discharge pipe of receptacle B into C and 33 the discharge for the last and smaller receptacle C.

It will be observed that the overflow edge 18 of the inner tank is of less height than the three remaining partitions of said tank, that the milk discharge pipes are located below the overflow edge 18 (see distance $x$ of Fig. 2 of receptacles A) and that the hot water discharge pipes are arranged below the milk discharge pipes (see distance $y$ of Fig. 2) for the purpose as will be explained hereinafter.

The operation of my improved apparatus for concentrating milk is as follows:—The cow's milk which is to be concentrated or treated is forced or pumped in a continuous stream into the filter 30, is freed of all solid impurities and is discharged into the inner tank 9 of the receptacle A. The hot water having been turned on flows through the pipe 12 and fills up the space between the outer or larger tank 6 and the inner or smaller tank 9 and then flows off at the discharge pipe 15. In this manner the inner tank is kept at a constant temperature of about 150 degrees Fahrenheit or even somewhat higher at times without serious injury to the milk, the temperature being readily regulated by the admittance of more or less hot water through the pipe 12. The air supply having previously been turned on by the valve 22, which is connected with any well known source of supply under pressure, such as a pump or blower, forces the air into the branch air pipes 23 which are placed just over the bottom of the inner tank and extend nearly the entire length of the same, and they are supplied with innumerable small holes or perforations through which the fine jets of air are discharged in all directions and whereby the whole mass is kept in a constantly violent agitation. As the air bubbles rise they collide and strike against the screens which break them up and also at the same time separate the milk particles. As the air passes through the milk, it absorbs the moisture and carries it away when it leaves the tank. At times, according to the temperature of the weather, it may be desirable to first heat the air by passing it over a heated coil and by this means the evaporation is very effective. In case of foaming, that is when the air bubbles do not readily disengage themselves from the milk it rises and the foam runs over the overflow edge 18 and down the inclined trough 19 and through the discharge 20 where it is caught in a vessel and where the milk gradually settles to be turned back into the tank. As the nature of the milk is rather sticky, it is apt to adhere to the walls of the tank and if these walls should be hot the milk would dry and get baked or burned to the walls and spoil the flavor and discolor the product. For this reason it is important that the hot water discharge 15 should be below the milk discharge 31 (as indicated by the distance $y$ in Fig. 2) as by this arrangement there is always some milk above the highest heated point, and the walls above the milk is comparatively cool and no baking to the walls can occur. It will also be noticed, that the overflow edge 18 is quite a distance above the milk discharge 31 (as indicated by the distance $x$ see Fig. 2); this is for the following reason. As soon as the air is forced into the volume of milk the surface rises due to the space which the air bubbles require, and a part of the milk begins to flow through the discharge pipe 31 of the tank 9, into the tank 10 of receptacle B, but if the agitation is too violent and foaming sets in the foam will pass over the edge 18 and be carried off by the trough 20. I have arranged the filter 30, by which the milk enters the first receptacle A to the left of the apparatus and the milk discharge at the right hand side of the receptacle as far away as possible. The discharge 32 from the receptacle B, is to the left hand side of the tank and again the discharge 33, of receptacle C is on the right hand side, always placing the delivery of the milk into the tanks on the opposite side and as far away as possible from the discharge.

To produce a concentrated milk in which the constituents of the same are chemically unchanged and the composition is exactly the same as milk drawn from the cow, with the exception of part of the water being mechanically evaporated, the milk must not be subjected to a temperature higher than 162 degrees Fahrenheit, in fact should not reach that temperature and for that reason, I maintain the temperature in the first receptacle at 150 degrees. The principal constituents of milk are water, milk fat, and non-fatty solids, varying considerably according to the season and according to the feed the cows receive, the proportion of fat varying especially.

To evaporate the water at the greatest rapidity it is advisable to maintain as high a temperature as possible at all stages from the beginning to finish, but this is not practicable for the reason that as the concentration increases, the danger of burning becomes greater and the temperature should therefore be reduced and for this reason I gradually draw off the partly concentrated milk from the tank 9 into the tank 10, which is kept at a lower temperature of about 120 degrees Fahrenheit. In this tank 10, a further reduction or concentration takes place and is then delivered through the discharge 32 into the tank 11. As the mass is now approximately approaching the consistency of so called condensed milk and quite sticky the utmost care must be taken not to burn and spoil the mass in the last stage of the concentration and for that reason, I apply to the last tank 11 only a temperature of about 90 degrees Fahrenheit and as the milk leaves this tank it is similar in appearance to ordinary condensed milk, but differs therefrom, in that it retains all the original solid constituents of milk unimpaired, and that by again adding a certain portion of water, corresponding to the amount expelled by the evaporating process and then thoroughly mechanically stirring the same, the milk will be restored to the same quality consistency and condition as before the treatment.

It is a well known fact that milk has been mechanically reduced by applying external heat and injecting air which evaporates the water in the milk and whereby the product is sterilized and many deleterious microbes are destroyed. But this reduction has always been carried on in one tank where the externally applied heat had to be regulated and as the reduction of the mass proceeded the hot water was gradually drawn off so as to keep the walls of the vessel cool above the product. Another disadvantage of this procedure is, that as the mass is reduced the milk is splashed up against the walls of the same sticks to the same and dries and is baked, flakes off and falls into the milk, whereas in my apparatus the milk flows from one tank into the other, therefore is always maintained at the same height in the tanks and the hot water level is kept constantly below the discharge of the milk and therefore this sticking and baking to the walls cannot occur as clearly indicated by the distance $y$ of Fig. 2. As previously stated the milk is reduced to about one third of its original bulk and therefore, about three times as much milk enters from the filter 30 into tank 9, as is delivered at the discharge 33 of tank 11, and to keep the tanks filled it is necessary that each succeeding tank should be smaller.

Having described my invention what I claim and desire to secure by Letters Patent, is:—

1. An apparatus for concentrating milk, which consists of a double tank, the inner tank adapted to receive the milk and provided with an outlet to discharge the same, the outer tank being connected with supply and discharge pipes which furnish hot water to keep the inner tank at a predetermined temperature, the inner tank provided with a series of air pipes connected to a supply of air under pressure and extending and arranged along the bottom of said inner tank and provided throughout their lengths with innumerable air jet discharge apertures, an overflow on the inner tank and an inclined trough between the outer and inner tanks, substantially as described.

2. An apparatus for concentrating milk, comprising a double tank one depending into the other, the inner tank adapted to receive and discharge the milk and also provided with an overflow, a series of air pipes connected to a supply of air under pressure and extending and arranged along the bottom of said tank and provided throughout their lengths with innumerable air jet discharge apertures, means to break up the air bubbles consisting of a screen provided with numerous interstices, the outer tank provided with receiving and discharging pipes connected to a supply of hot water by which the inner tank is maintained at a certain temperature and an inclined trough between the inner and outer tank, substantially as described.

3. An apparatus for concentrating milk, comprising a series of receptacles, each receptacle consisting of a double tank one within the other, the outer or larger tank being provided with a supply of hot water, the inner or smaller tank adapted to receive the milk and arranged to set within said outer hot water tank, air pipes connected to a supply of air under pressure and extending and arranged along the bottom of said inner tank and provided throughout their lengths with innumerable air jet discharge apertures, an overflow on the inner tank and a trough between the inner and outer tank, substantially as described.

4. An apparatus for concentrating milk, comprising a series of receptacles placed side by side to one another each succeeding receptacle being of smaller capacity than the previous one and each receptacle consisting of a double tank one within the other, the outer or larger tank being provided with a supply of hot water, the inner or smaller tank adapted to receive the milk and arranged and set within said outer hot water tank, air pipes connected to a supply of air under pressure and extending and arranged along the bottom of said inner tank and provided throughout their lengths with innumerable air jet discharge apertures, an overflow on the inner tank and a trough between the inner and outer tank, substantially as described.

5. An apparatus for concentrating milk, comprising a series of receptacles placed side by side to one another and of varying capacity, each receptacle consisting of a double tank one within the other, the outer or larger tank being provided with a supply of hot water, the inner or smaller tank adapted to receive the milk and arranged to set within said outer tank, air pipes connected to a supply of air under pressure and extending and arranged along the bottom of said inner tank and provided throughout their lengths with innumerable air jet discharge apertures, means to break up the air bubbles consisting of a screen depending into said inner tank, an overflow on the inner tank and a trough between the inner and the outer tank, substantially as described.

6. An apparatus for concentrating milk, comprising a series of receptacles placed adjacent to each other, each receptacle comprising a double tank one within the other, the outer tank provided with hot water supply and discharge pipes, the inner tank provided with means for injecting air into the milk and also provided with the overflow edge 18 and the milk discharge pipe, said overflow edge being of less height than the other walls of the inner tank and said milk discharge pipe being placed below the said overflow edge substantially as described and for the purpose set forth.

7. An apparatus for concentrating milk, comprising a series of receptacles placed adjacent to each other, each receptacle comprising a double tank one within the other, the outer tank provided with hot water supply and discharge, the inner tank provided with means for injecting air into the milk and also provided with the overflow edge 18 and the milk discharge pipe, said overflow edge being of less height than the other walls of the inner tank and said milk discharge pipe being placed below the overflow edge, the said hot water discharge of the outer tank placed below the said milk discharge of the inner tank to prevent the milk from baking to the walls of the inner tank, substantially as described.

8. An apparatus for concentrating milk which consists of the following instrumentalities, receptacles of decreasing capacity, said receptacles placed in positions that the milk flows from the larger to the smaller, each receptacle comprising an outer and an inner tank placed within the other and forming a space between said tanks, means for heating said space between the tanks of the various receptacles at different temperatures, a group of pipes connected to a supply of air under pressure and extending and arranged along the bottom of the inner tanks, and provided throughout their lengths with innumerable air jet discharge apertures, overflow edges on the inner tanks, inclined troughs between the inner and outer tanks, milk discharge pipes connected to the said inner tanks and placed below the overflow edges, hot water discharge pipes connected to the said outer tanks and placed below the milk discharge pipes, substantially as described for the purpose set forth.

9. An apparatus of the class described comprising inner and outer tanks and a web connecting the tanks above their bottoms to present an inclosed hot water space, one portion of the web being lower than the remainder thereof and being channeled to present a trough.

10. An apparatus of the class described comprising inner and outer tanks and a web connecting the tanks above their bottoms to present an inclosed hot water space one portion of the web being lower than the remainder and being channeled and also inclined.

EDWARD EMIL CLAUSSEN.

Witnesses:
GEORGE MORTSON,
B. S. WOODWARD.